United States Patent [19]
Nicolai

[11] Patent Number: 6,131,854
[45] Date of Patent: Oct. 17, 2000

[54] GROUND HANDLING APPARATUS FOR UNMANNED TACTICAL AIRCRAFT

[75] Inventor: Leland M. Nicolai, Castaic, Calif.

[73] Assignee: Lockheed Martin Corporation, Palmdale, Calif.

[21] Appl. No.: 09/131,136

[22] Filed: Aug. 7, 1998

[51] Int. Cl.⁷ .................................................. B64C 39/02
[52] U.S. Cl. ........................................................ 244/114 R
[58] Field of Search ................................ 244/114 R, 1 R

[56] References Cited

U.S. PATENT DOCUMENTS

| | | | |
|---|---|---|---|
| 2,736,520 | 2/1956 | Chichester, Jr. | 244/144 R |
| 3,380,690 | 4/1968 | Rego | 244/114 R |
| 4,325,317 | 4/1982 | Wilford | 244/114 F |
| 5,503,350 | 4/1996 | Foote | 244/1 R |

*Primary Examiner*—J. Woodrow Eldred
*Attorney, Agent, or Firm*—Robert A. Schruhl

[57] ABSTRACT

A system for servicing unmanned aircraft includes an aircraft service area located adjacent a landing strip, a track and follower mechanism, and a plurality of stations disposed along the track and follower mechanism including a first station having apparatus for connecting the aircraft to the track and follower mechanism, a second station for reading information from and to a computer located onboard the aircraft, a third station for removing old weapons from and securing new weapons to the aircraft, and a fourth station for refueling the aircraft. The aircraft is able to move under its own power from the runway to the aircraft service area following landing on the runway, and from the aircraft service area to the runway for takeoff following servicing of the aircraft. A differential GPS apparatus is used to navigate the aircraft from the runway to the aircraft service area and the apparatus for connecting the aircraft to the track means at the first station includes apparatus for engaging a front wheel of the aircraft.

3 Claims, 2 Drawing Sheets

GROUND HANDLING APPARATUS FOR UNMANNED TACTICAL AIRCRAFT

BACKGROUND OF THE INVENTION

1. Field of the Invention

The present invention relates generally to air ground handling apparatus, and more particularly to an automated system for handling unmanned aircraft following landing to accomplish servicing tasks, and then releasing the aircraft for takeoff under its own power, thereby requiring fewer personnel for ground handling functions.

2. Description of Related Art

Various systems for handling aircraft after landing are well-known, as for example, those shown in U.S. Pat. No. 2,736,520 to Chichester, Jr., U.S. Pat. No. 3,380,690 to Rego, and U.S. Pat. No. 4,325,317 to Wilford.

In the Chichester, Jr. patent, a helicopter is towed around a roof-top service area between servicing stations using apparatus that is manually connected to the helicopter. In the Rego patent, an aircraft without landing gear lands and takes off from an elongated array of rollers that constitutes the landing strip and further is moved from the landing strip to various servicing stations and then back to the landing strip for takeoff via a towing mechanism including a roller supported platform to and from which the aircraft is transferred. In the Wilford patent, aircraft are moved from one servicing station to another on an aircraft carrier using a conveyor mechanism.

Against this background of known technology, the inventor has developed a system for moving unmanned fighter aircraft from the runway of an airfield through various servicing stations, while permitting the aircraft to take off and land under their own power. Such an arrangement permits a substantial reduction in personnel otherwise required for performing the same functions required manned aircraft.

OBJECTS AND SUMMARY OF THE INVENTION

It is therefore an object of the present invention to provide a novel automated system for moving aircraft from one ground service station to another following landing and in preparation for another takeoff, while overcoming many of the disadvantages and drawbacks of the previously known solutions.

Another object of the present invention is to provide a novel aircraft ground handling system in which landing, taxiing, and takeoff are effected under the aircraft's own power, while movement of the aircraft through various servicing stations in the ground handling system are effected by a towing mechanism engaged by the aircraft when it enters the ground handling system.

Still another objective of the present invention is to provide an aircraft ground handling system for ground servicing in which the aircraft navigates the landing strip to various ground servicing stations using on board sensors and a stored database of landing strip information, as well as a differential GPS system.

DETAILED DESCRIPTION OF THE INVENTION

The following description is provided to enable any person skilled in the art to make and use the invention, and sets forth the best modes contemplated by the inventor of carrying out his invention.

Various modifications, however, will remain readily apparent to those skilled in the art, since only the generic principles of the present invention have been defined herein specifically to provide teachings for a ground handling system that encompasses many long sought after features.

An "unmanned tactical aircraft" as used in this application, and as is currently understood in the related arts, is an unmanned tactical strike fighter aircraft having the capacity to perform all warfare strike missions. Typically, such an aircraft is operated autonomously in flight until or unless a remote offboard operator takes control of the aircraft.

Figure 1:
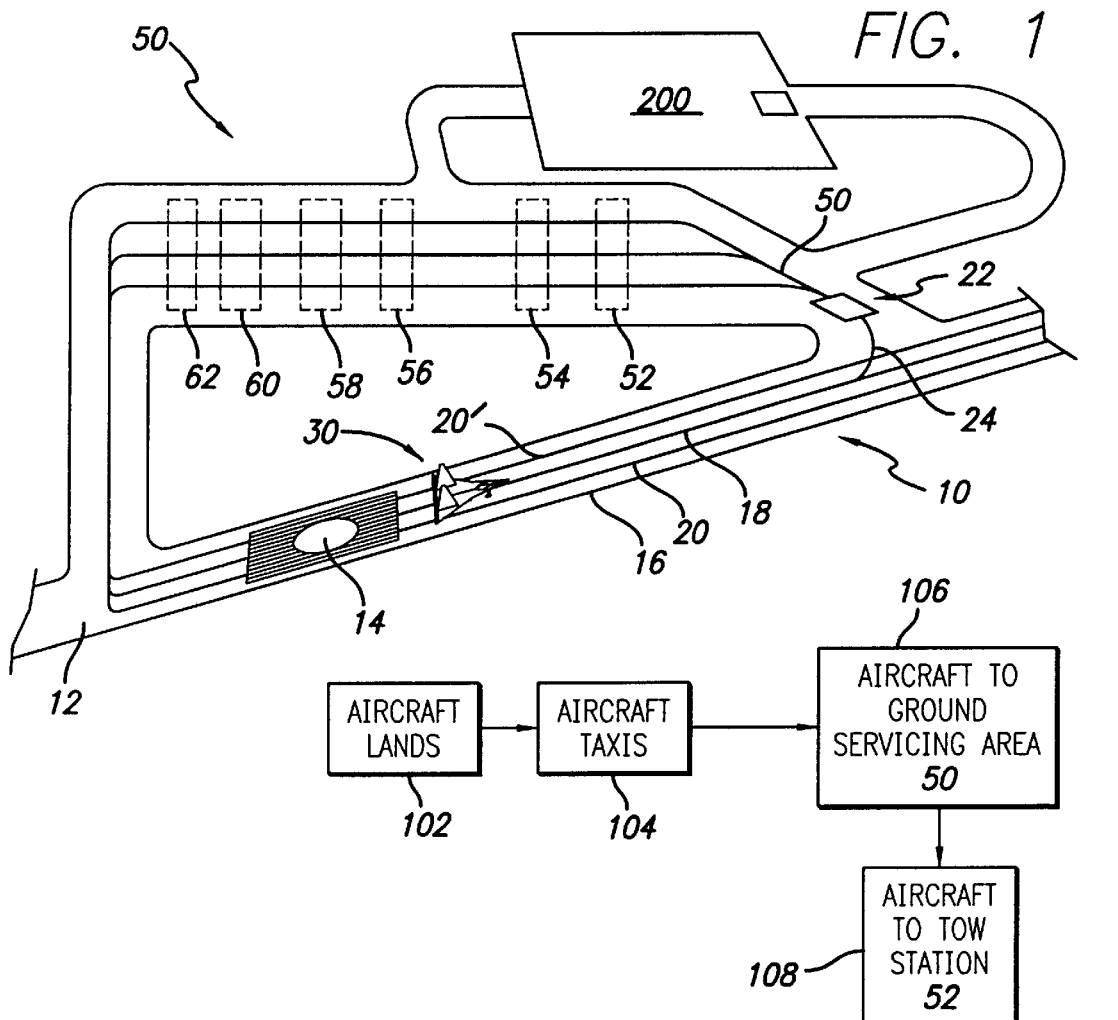
FIG. 1 shows the various servicing stations of a ground handling system proximate to a landing strip in accordance with the teachings of the present invention.

Referring now to FIG. 1, there is shown a landing strip or runway 10 and a ground servicing area 50 designed for use with unmanned aircraft 30 in accordance with the teachings of the present invention. At one end of the runway 10 is a holding area 12 for aircraft preparing to take off. A touchdown area 14 is located downstream of the holding area. A taxi strip 16, located further downstream of the touchdown area 14, is provided with a centerline 18 and outer guide lines 20, 20' located on opposite sides of the centerline 18. An off-ramp 22 leads to the ground servicing area 50. An auxiliary centerline 24 splits off from the runway centerline 18 in the vicinity, and leads into the mouth, of the off-ramp 22. The off-ramp 22 then leads into the ground servicing area 50.

The ground servicing area 50 contains several stations at which various functions are performed, including a first tow-coupling station 52, a second bit check station 54, a third weapons removal station 56, a fouth weapons supply station 58, a fifth refueling station 60, and a sixth tow-decoupling station 62.

Figure 2:
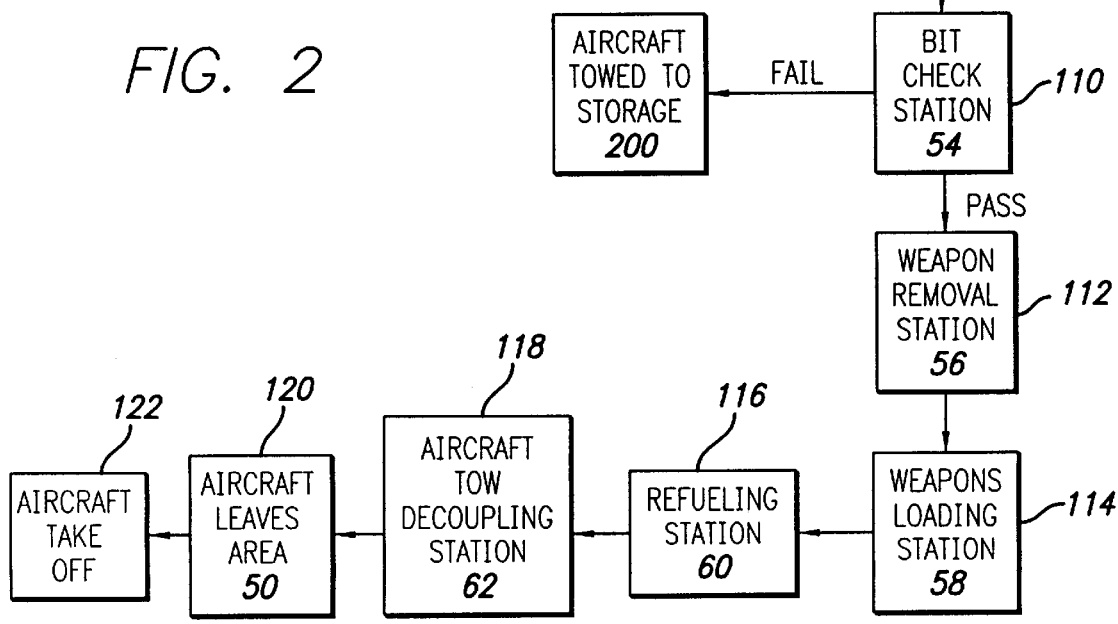
FIG. 2 is block diagram illustrating the steps that take place in the aircraft servicing process of the present invention.
Figure 3:
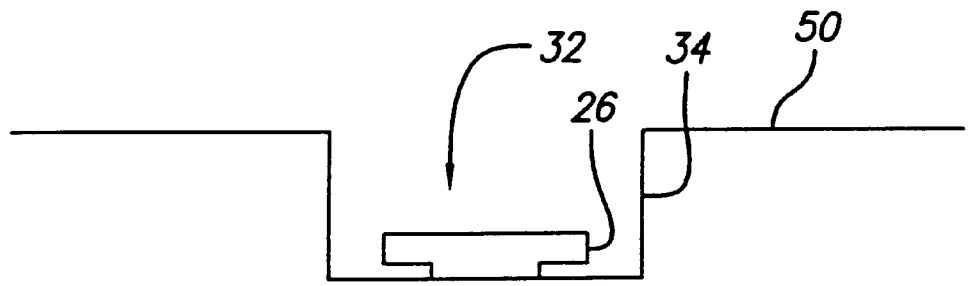
FIG. 3 is a cross sectional view of towing mechanism 32 showing tractor 26 located in underground housing 34 in ground service area 50.
Figure 4:
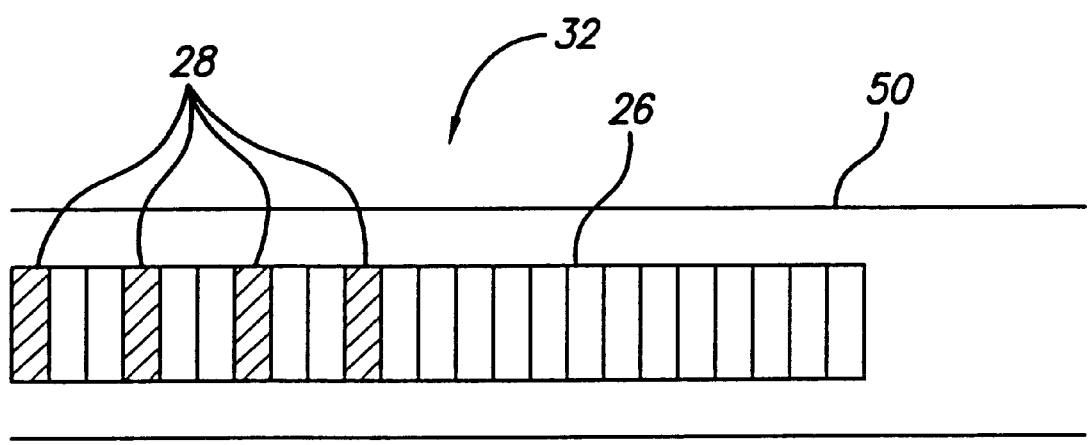
FIG. 4 is a top aerial view of towing mechanism 32 showing tractor 26 with follower 28 mounted or riding on said tractor for attaching or coupling to an aircraft for movement through service area 50.

Referring now to FIGS. 1 and 2, after an aircraft lands on the runway in the touchdown area (step 102 in FIG. 2), it continues to taxi along the runway following the centerline and using differential GPS (step 104 in FIG. 2). At the off-ramp, the aircraft turns into the ground servicing area 50 (step 106 in FIG. 2). At the first station 52, the aircraft is coupled to a towing mechanism (not shown) so that the aircraft can be moved at various speeds and with desired intervals of motion to accomplish the servicing necessary for a new mission (step 108 in FIG. 2). The towing mechanism 32, as shown in FIGS. 3 and 4, is preferably one which includes a tractor 26 located in an underground housing 34 on which is mounted a follower 28 that can be attached or coupled to the aircraft via engagement with the aircraft front wheel is preferably one which includes a tractor located in an underground housing on which is mounted a follower that can be attached or coupled to the aircraft via engagement with the aircraft front wheel. Coupling can be effected automatically or with the assistance of ground personnel. The speeds and motions at which the aircraft are led through the ground servicing area 50 are determined in accordance with servicing requirements. These determinations can be made by one or more operators located in the ground servicing area or at some location remote from the ground servicing area, or by an automated system at or in the vicinity of the ground servicing area. In the latter case, controls can be incorporated into the system at the various stations so that movement of the aircraft from that station will not occur until all functions required to be performed at that station have been accomplished.

At the second station 54, a BIT check is performed on the aircraft's onboard computer (step 110 in FIG. 2). The BIT check according to the present invention would involve an IR or RF sensor/source at the second station 54 (or in the ground servicing area 50) communicating with an IR or RF sensor/source on the aircraft (not shown) to determine the status of all systems on the aircraft.

If the aircraft passes the BIT check, the information for the next mission is transmitted and downloaded into the OTA mission computer. The towing mechanism is actuated, and the aircraft is moved to the third station 56 where the weapons remaining on the aircraft after its last mission are removed (step 112 in FIG. 2).

If the aircraft fails the BIT check, it is moved by the towing mechanism to a holding or storage area 200 where a ground technician can determine the extent of the aircraft's problems and fix them when and if possible (step 114 in FIG. 2).

At the weapons removal station 56, all weapons remaining on the aircraft can be automatically or manually removed. This prepares the aircraft for receipt of a new array of weapons when it is towed to the weapons loading station 58 in preparation for a new mission.

The present invention contemplates that weapon loading and unloading can be accomplished using conventional and traditional apparatus and techniques or an automatic weapon loading apparatus. Naturally, precision alignment of the weapons in the weapons bay of an aircraft is important. One known mechanism to accomplish such precision loading is a push/pull mechanism. The present invention contemplates that such a mechanism could be coordinated with the tractor mechanism for towing the aircraft into place in this station such that the connection assembly to which the weapon is attached on the aircraft would be precisely aligned with the connection mechanism on the weapon itself.

The aircraft is next towed to the fifth, aircraft refueling, station 60 located downstream of the weapons loading station 58 (see step 116 in FIG. 2). With the towing mechanism actuated, the aircraft could be positioned with great precision so that refueling equipment could be tightly attached. Refueling could be performed automatically or manually.

After refueling has been completed, the aircraft engine is powered up, and the aircraft under its own power moves out of the refueling station past the end of the underground housing for the towing mechanism so that the front wheel disengages from the follower (step 118 in FIG. 2). Thereafter, under its own power, the aircraft leaves the ground servicing area 50 (step 120 in FIG. 2) for an approach to the holding area 16 to get ready for takeoff (step 122 in FIG. 2) on the runway 10.

In summary, unmanned tactical aircraft must always be on the ready is they are to be of utmost value, whether during peacetime or wartime. The invention contemplates that the flight and mission information from sensors onboard the unmanned aircraft is data-linked near real-time to the offboard operator so that all information normally available to an onboard pilot is available for making decisions. During peacetime, the unmanned aircraft would be kept in flyable storage in storage area 200 (see FIG. 1), and the offboard operator would remain proficient through simulations. Thus, peacetime operation and support costs would be a fraction of an equivalent manned strike aircraft unit.

During peacetime, the number of persons required to service the unmanned aircraft is small. Such a small active duty ground support unit would remain proficient for servicing the unmanned aircraft during wartime through simulation training during peacetime.

Those skilled in the art will appreciate that various adoptions and modifications of the invention as described above can be configured without departing from the scope and spirit of the invention. Therefore, it is to be understood that, within the scope of the appended claims, the invention may be practiced other than as specifically described herein.

What is claim is:

1. A system for servicing unmanned fighter aircraft following landing of the aircraft on a landing strip, comprising:
    said aircraft having at least one front wheel, an aircraft service area located adjacent the landing strip and including track means leading to and from the landing strip and a plurality of stations in the service area disposed along the track means, said stations including a first station including means for connecting the aircraft to the track means, a second station for reading information from and to a computer located onboard the aircraft, a third station for removing old weapons from and securing new weapons to the aircraft, and a fourth station for refueling the aircraft, said aircraft being able to move under its own power from the runway to the aircraft service area following landing of the aircraft on the runway, and from the aircraft service area following servicing of the aircraft to the runway for takeoff.

2. The system of claim 1, wherein said aircraft includes a differential global positioning satellite apparatus for use navigating the aircraft from the runway to the aircraft service area and means for connecting the aircraft to the track means at the first station includes means for engaging said front wheel of said aircraft.

3. The system of claim 2, wherein said track means includes tractor means coupled to said said track means, and follower means coupled to said tractor means and adapted to be driven along the track means, said follower means being engageable by said front wheel of said aircraft when said aircraft enters the first station, whereby the follower means can be driven with translational movement along the track means to advance said aircraft sequentially from one station to another through said ground servicing area.

* * * * *